Sept. 12, 1939.  E. KIRCH  2,172,978
HIGH FREQUENCY CABLE
Filed Sept. 15, 1936
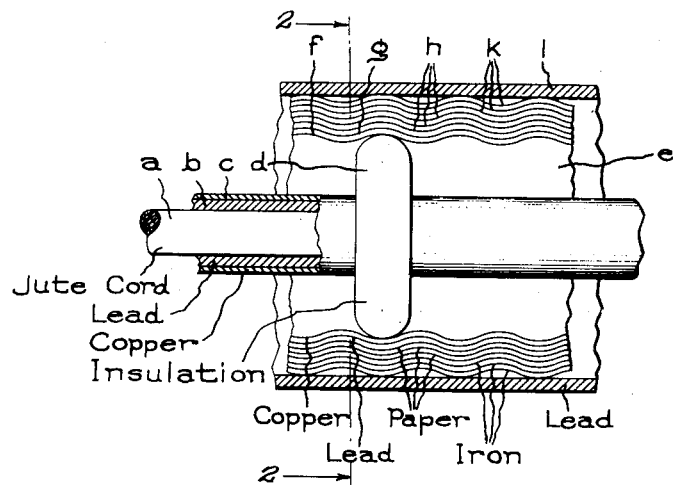
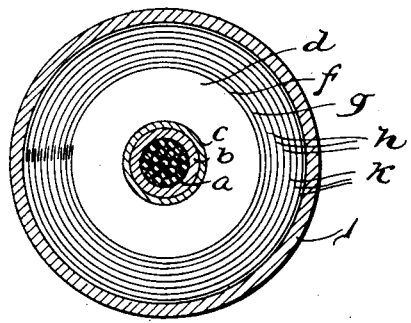
Inventor:
Ernst Kirch,
by Harry E. Dunham
His Attorney.

Patented Sept. 12, 1939

2,172,978

UNITED STATES PATENT OFFICE 2,172,978

HIGH FREQUENCY CABLE

Ernst Kirch, Berlin-Friedenau, Germany, assignor to General Electric Company, a corporation of New York Application September 15, 1936, Serial No. 100,947
In Germany September 19, 1935

6 Claims. (Cl. 174—28)

High frequency cables for the transmission of large output over a short distance or small output over a great distance are ordinarily designed as concentric conductors. One conductor may be solid wire or a tube and the second conductor a hollow tube of high conductivity spaced around the first conductor by members of insulating material. Sections of such cable have been linked together by means of ball joints with adjacent sections of the tube overlapping each other to form the joint. Over such a cable a lead casing has been provided and in some cases in place of the lead casing an armor such as a spirally wound band of metal or wire or interlocking armor has been provided. One disadvantage of this arrangement is that in the manufacture of the cable a comparatively large quantity of copper must be used to secure adequate rigidity of the tube. In addition, the manufacture of this cable is comparatively expensive. Also where the cable is divided into sections with ball joints there is a considerable tendency for the lead casing to be damaged directly over the joint due to the stresses at these points.

An object of the invention is to overcome these disadvantages and to provide an improved cable with a low heat loss and at the same time provide a flexible cable without sub-dividing it into sections using relatively inexpensive material such as iron bands alone or in combination with paper layers or lead bands. The concentric conductor for my improved high frequency cable can be manufactured by using bands formed on a mandrel with a sufficient number of layers to produce adequate rigidity of the tube. The tube is preferably formed in an undulating shape by passing it between a mandrel having a thread and a nut having a corresponding thread located over the mandrel, one part being fixed and the other rotating. By provision of this undulated shape adequate flexibility and stability are obtained and the electrical resistance of the conducting layer is kept low by making the undulations relatively shallow. A cable formed in accordance with my invention is described below:

A copper band of a thickness depending upon the penetration depth of the high frequency current it is desired to transmit is wound on a mandrel. It is desirable when employing a band with high conductivity to overlap the turns to insure a good contact between the adjacent turns. Over this copper band an overlapping thin lead band is wound. Over this lead band several layers of paper impregnated with a bituminous compound are applied. Over the paper several bands of iron are wound to provide adequate rigidity and to insure a smooth outer surface. These iron bands may be wound overlapping, if desired. The layers of lead bands and iron bands may be reversed in position or one or the other may be omitted depending upon the rigidity required. The tube thus formed is then corrugated in the manner described above by passing it between a mandrel and a nut. The corrugation of the tube insures a good electrical contact between the bands of high conductivity. The lead layer and paper impregnated with a bituminous compound produce a weatherproof return conductor for the cable. In order to avoid any possibility of resistance losses between adjacent turns of a spirally wound band of high conductivity, this band may be formed by applying it on the mandrel in a longitudinal direction and producing a longitudinal seam. A multiwalled tube of high conducting material may thus be formed by a plurality of layers of high conductivity. In this manner a tubular flexible conductor for a high frequency cable may be produced with the interior and exterior surface of the tube covered with a thin copper band layer, the tube as a whole being formed from relatively low cost material. If desired, my improved cable may be provided with an overall lead casing or armor if it is necessary to have such a casing to protect it in the laying of the cable. However, when the layers of lead and paper are sufficiently thick the armor is unnecessary. The inner conductor of the high frequency cable can be constructed either as a tube or as a solid or stranded conductor or formed in the same manner as the outer conductor. In the latter case it would be necessary to provide a high conducting layer on the surface of the conductor. The cable can be manufactured by forming the inner and outer conductors separately then applying the spacers to the inner conductor and drawing it within the outer conductor. The cable may be manufactured continuously in great lengths by locating the machines for manufacturing the inner and outer conductor one behind the other and providing distance or spacing members which are applied prior to the insertion of the inner conductor into the outer conductor between the machines manufacturing the two conductors. The outer conductor can also be manufactured directly over the inner conductor with the distance pieces mounted on it.

In the drawing, Fig. 1 is a longitudinal sectional view of my improved high frequency cable, and Fig. 2 is a cross-sectional view taken along the line 2—2 of Fig. 1, showing the overlapped turns of the outer conductors.

A jute cord $a$ has a lead tube $b$ pressed over it serving as a carrier for a thin coating $c$ of a material of high conductivity that serves as the conductor. The distance pieces are indicated at $d$. On the inner side of tube $e$ formed of a plurality of bands making a self-supporting flexible conductor there is located a thin copper band layer $f$ serving as the return conductor. Over the copper band layer $f$ is located one or more layers of lead bands $g$. Over the lead bands $g$ is located a plurality of layers of paper $h$ impregnated with a bituminous compound. Over the paper $h$ is located several layers of iron bands $k$. Over all a lead casing $l$ is provided.

By my invention a concentric return conductor is provided with protection against collapse in the event of a voltage stress or mechanical loading of the cable. Also, since a uniform distance between the inner and outer conductor is assured, the electrical constants such as the capacity inductance and dielectric strength are uniform throughout the length of the cable. With a uniform flexibility of the return conductor made in accordance with the invention there are no local stresses in the lead casing produced by the bending or flexing of the cable.

If cables of particularly light weight are required the lead casing can be dispensed with altogether in the construction of the return conductor which is of especial importance for cables to be installed on ships. The advantages of my construction are obtained with a minimum quantity of high conducting and therefore expensive material.

A further advantage of my construction is that with copper or iron bands in combination with insulating bands between them the inner conductor or the outer conductor can simultaneously be used as a forward or return conductor for a low frequency current or direct current. Such an advantage is of particular importance, for instance, when the high frequency cables are used for passing the energy necessary for an amplifier located at a considerable distance from the receiver or transmitter.

What I claim as new and desire to secure by Letters Patent of the United States is:

1. An electric cable consisting of an inner conductor and an outer conductor said outer conductor comprising layers of bands wound one over another with the inner layer formed of high conductivity material and superposed reenforcing layers of lead bands, paper and iron bands.

2. An electric cable comprising an inner conductor and an outer conductor surrounding said inner conductor said outer conductor being formed of an inner layer of high conductivity material, and superposed layers of reenforcing and insulating material all of said layers being corrugated as a unit.

3. An electric cable comprising an inner conductor and a concentric tubular outer conductor adapted to house said inner conductor, distance pieces separating said conductors, said outer conductor being corrugated and said pieces being held by said corrugations.

4. An electric cable comprising an inner conductor and an outer tubular conductor housing said inner conductor, said outer conductor comprising an inner layer of high conductivity material, a superposed reinforcing layer of lead, a second reinforcing layer of paper and a third reinforcing of iron, all of said layers being corrugated as a unit.

5. An electric cable comprising an inner conductor and an outer tubular conductor housing said inner conductor, said outer conductor comprising an inner layer of high conductivity material, a superposed reinforcing layer of lead, a second reinforcing layer of paper, and a third reinforcing layer of iron.

6. An electric cable comprising an outer conductor and an inner conductor nested within said outer conductor, said inner conductor comprising a supporting core, a superposed reinforcing layer and a surface layer of high conductivity material, said outer conductor comprising an inner layer of high conductivity material, superposed reinforcing layers of lead and paper, and an outer layer of iron, all of said layers of said outer conductor being corrugated as a unit and spacer elements acting to hold said conductors in nested relation.

ERNST KIRCH.

---

CERTIFICATE OF CORRECTION.

Patent No. 2,172,978. September 12, 1939.

ERNST KIRCH.

It is hereby certified that error appears in the printed specification of the above numbered patent requiring correction as follows: Page 2, second column, line 26, claim 4, after the word "reinforcing" insert layer; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.